Patented Nov. 2, 1937

2,097,442

UNITED STATES PATENT OFFICE 2,097,442

PROCESS OF CHLORINATING 1,1-DICHLORPROPENE-1

Oliver W. Cass, Niagara Falls, N. Y., assignor to E. I. du Pont de Nemours & Company, Wilmington, Del., a corporation of Delaware No Drawing. Application May 13, 1935, Serial No. 21,301

6 Claims. (Cl. 260—162)

This application relates to chlorinated products, more particularly chlorinated propane, and methods of manufacturing these compounds. More specifically it relates to the preparation of 1,1,1,2 - tetrachlorpropane, $CH_3.CHCl.CCl_3$, by chlorination of 1,1-dichlorpropene-1, $$CH_3.CH=CCl_2$$

The preparation of 1,1-dichlorpropene-1 is disclosed in my co-pending application Ser. No. 21,300, filed May 13, 1935. This compound, which when pure is a colorless liquid boiling at a temperature of about 77–78° C., is readily prepared from saturated chlorinated derivatives by reacting such derivatives with a basic material.

For the chlorination of 1,1-dichlorpropene-1, in order to prepare the saturated chlorinated derivative, 1,1,1,2-tetrachlorpropane, a liquid phase reaction in which the chlorine is added in the cold has been found most effective. A chlorination catalyst such as ferric chloride, $FeCl_3$, may be used, although a catalyst is not absolutely essential and the reaction proceeds without it though at a relatively low rate of speed. Other chlorination catalysts such as iodine, sulfur, antimony trichloride and aluminum chloride may also be used. The exposure of the reaction products or the reaction mixture to the action of light is undesirable since it results in various undesirable by-products.

The maintenance of too high a temperature may also be undesirable because heat possesses, in a very much lower degree, the same undesirable effects as light. For this reason, it is preferred that the temperature be below room temperature or at least within the range 0–30° C. The reaction is exothermic and proceeds rapidly at temperatures within this range. For the maintenance of a low temperature it is desirable to provide the reaction vessel with cooling means, such as a water jacket.

When light is excluded and chlorine is passed into 1,1-dichlorpropene-1 in the liquid phase, undesirable isomers are not produced in substantial amounts, the yield of 1,1,1,2-tetrachlorpropane being practically quantitative. For convenience, I prefer to carry out the reaction in the presence of ferric chloride, $FeCl_3$, as a chlorination catalyst, since in this manner the reaction is completed within a relatively short period of time.

The reaction occurring may be expressed as follows:

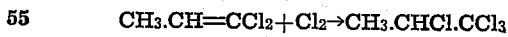

As an example of the novel improved process for the manufacture of chlorinated derivatives the following may be given:—

*Example*

666 grams of 1,1-dichlorpropene-1 and 6.6 grams of anhydrous ferric chloride were placed in a 1 liter, 3-necked flask equipped with a stirrer, an inlet tube for chlorine gas, and a reflux condenser. The flask was placed in an ice bath and shielded from the light. Then 411 grams of chlorine gas were passed in during a 4 hour reaction period. The reaction product was thoroughly washed with water and then with sodium carbonate solution, dried and distilled. 984 grams of 1,1,1,2-tetrachlorpropane were secured, which represents a yield of 90% of the theoretical based on the amount of 1,1-dichlorpropene-1 used up in the reaction.

It is to be understood that the various details of temperature and other conditions described in the foregoing example are to be considered as illustrative and not restrictive. Thus, various changes might be made in the temperature, amounts, time of reaction, and other conditions which would still be within the scope of the invention. For example, while the maintenance of a temperature within the range 0–30° C. is desirable in order that the yield may be practically quantitative, it is possible to operate at more elevated temperatures, if light is excluded, and still obtain high yields of 1,1,1,2-tetrachlorpropane. Since various changes may be made in the details of the process without departing from the spirit of the invention, the scope is to be construed solely in accordance with the appended claims.

I claim:

1. A process for preparing chlorinated derivatives of propane which comprises reacting chlorine and 1,1-dichlorpropene-1 in the liquid phase in the dark at a temperature within the range 0–30° C.

2. A process for preparing chlorinated derivatives of propane which comprises reacting chlorine and 1,1-dichlorpropene-1 in the liquid phase in the presence of a chlorination catalyst and in the substantial absence of light at a temperature within the range 0–30° C.

3. A process for preparing chlorinated derivatives of propane which comprises reacting chlorine and 1,1-dichlorpropene-1 in the liquid phase in the presence of ferric chloride as a catalyst and in the substantial absence of light at a temperature within the range 0–30° C.

4. A process of preparing 1,1,1,2-tetrachlorpropane which comprises reacting chlorine with 1,1-dichlorpropene-1 in the liquid phase in the presence of a chlorination catalyst and in the substantial absence of light at a temperature within the range 0-30° C.

5. A process for preparing 1,1,1,2-tetrachlorpropane which comprises reacting chlorine with 1,1-dichlorpropene-1 in the liquid phase and in the substantial absence of light at a temperature within the range 0-30° C.

6. A process for preparing 1,1,1,2-tetrachlorpropane which comprises reacting chlorine with 1,1-dichlorpropene-1 in the liquid phase in the presence of ferric chloride as a catalyst and in the substantial absence of light at a temperature within the range 0-30° C.

OLIVER W. CASS.